United States Patent [19]

Brugola

[11] Patent Number: 5,577,871
[45] Date of Patent: Nov. 26, 1996

[54] SCREW AND WRENCH FOR SNUGLY-FITTED TIGHTENINGS

[75] Inventor: Giannantonio Brugola, Muggio', Italy

[73] Assignee: A.S. TEC. Assistenza Tecnica s.r.l., Italy

[21] Appl. No.: 384,915

[22] Filed: Feb. 7, 1995

[30] Foreign Application Priority Data

Mar. 4, 1994 [IT] Italy .................. MI94A0392

[51] Int. Cl.$^6$ .................. F16B 23/00; F16B 35/06
[52] U.S. Cl. .................. 411/404; 411/410; 411/919
[58] Field of Search .................. 411/402, 403, 411/404, 407, 410, 919

[56] References Cited

U.S. PATENT DOCUMENTS

| | | |
|---|---|---|
| 4,187,892 | 2/1980 | Simmons . |
| 4,930,378 | 6/1990 | Colvin .................. 411/403 X |
| 5,174,704 | 12/1992 | Kazino et al. . |

FOREIGN PATENT DOCUMENTS 0002137  6/1983  WIPO .................. 411/403

*Primary Examiner*—Neill R. Wilson
*Attorney, Agent, or Firm*—Shlesinger, Fitzsimmons & Shlesinger

[57] ABSTRACT

A screw for snugly-fitted tightening pairs, of the type having a lobate head or a lobate-socket head (31), in which each lobe (37) is formed of one face (37') directed in a substantially circumferential manner and two other substantially parallel faces (35, 36) directed inwardly of the screw; said screw is provided with a reaction surface (33) with a tightening wrench (32). The portions of said reaction surface (33) included between two adjacent lobes are comprised each of a pair of faces (38, 39) inclined to each other to form an angle concave towards the outside of the screw, so as to constitute a reaction surface with a wrench of a polygonal profile. Such a screw can be operated to advantage either with the polygonal wrenches of the known art, or with an innovatory mating wrench of a lobate configuration.

7 Claims, 2 Drawing Sheets

SCREW AND WRENCH FOR SNUGLY-FITTED TIGHTENINGS

BACKGROUND OF THE INVENTION

The present invention relates to screws adapted for use in snugly-fitted tightening pairs. The invention further refers to wrenches or spanners for operating said screws. In the technology of snugly tightening pairs, screws are made in which the engagement surface of same with the corresponding wrench, consisting either of the outer surface of the screw head, or the side surface of an axial socket formed in the head itself, can take several different configurations.

The most used configurations for screw heads are those in the form of a square, a hexagon, a triangle, a double square, a double hexagon or a double triangle and those involving a socket of same shape. All these geometrical figures however consist of regular polygons so as to enable them to be operated in any angular position. In all the above typologies however, the reaction surfaces between the wrench and screw during the tightening action do not belong to radial planes passing through the rotation axis of the screw itself. Since the tightening force transmitted from the wrench to the screw, due to the application of a given driving torque or torque wrench setting, is directed perpendicularly to the reaction surface at the contact point, whereas the useful tightening force is directed tangentially of a circumference having as its center the screw axis and passing through the contact point, i.e. directed perpendicularly to said radial planes, it results therefrom that the more the reaction surfaces diverge from the radial planes, the lower the useful tightening force one can actually have at one's disposal as compared with the transmitted tightening force.

In particular, the efficiency in tightening of hexagonal-head or hexagonal-socket-head screws is very low (in the order of 50%).

In order to obviate a weak efficiency in these fastening pairs, cross-slotted screws have become increasingly more used, or in any case screws are used which have a head provided with a plurality (often six) of radial lobes or a lobate socket, so that the reaction surfaces lie at least partly in said substantially radial planes.

Screws provided with lobate heads, when tightening or unscrewing is to be carried out, need a wrench having a mating shape in order to achieve a high efficiency in terms of useful tightening force.

In the absence of such a wrench, operation of said screws would be very difficult. For this reason, the socket faces between the lobes or the external faces of the lobes of a lobate head respectively are such shaped that their section with a plane perpendicular to the screw axis belongs to one theoretical regular polygon alone; thus the screws, in case of emergency, can be operated by a traditional wrench, a hexagonal one for example in the case of a six-lobe screw.

In addition, due to the backlash existing between the wrench and screw, when a lobate screw is operated with a polygonal wrench, there is the risk that the lobate profile of said screw may be deformed at the lobe root due to crushing of the corners, so that subsequent insertions of the mating wrench are inhibited.

It is a general object of the present invention to obviate the above drawbacks by providing a screw having a lobate head or a lobate-socket head susceptible of being operated by a wrench of a mating profile, so as to achieve a high efficiency for the tightening pair, and also adapted to be operated by a traditional polygonal wrench, with a higher efficiency than obtainable with a similar coupling made with a lobate screw of the known art, without involving any risk that the corners of the reaction surface thereof will be irreparably deformed.

SUMMARY OF THE INVENTION

In view of the above object, in accordance with the invention a screw for snugly-fitted tightening pairs of the type having a lobate head or a lobate-socket head has been devised, in which each lobe is formed of a first face directed in a substantially circumferential manner and two other substantially parallel faces directed inwardly of the screw, characterized in that said screw is provided with a reaction surface with a tightening wrench, the portions of said reaction surface included between two adjacent lobes being made up each of a pair of faces inclined to each other to form an angle concave towards the outside of the screw so as to constitute a reaction surface with a wrench of a polygonal profile.

In addition a tightening wrench has been devised the shape of which matches that of the screw according to the invention.

BRIEF DESCRIPTION OF THE DRAWINGS

For a more fully comprehension of the innovatory principles of the present invention and the advantages it offers over the known art, a possible embodiment of the invention applying said principles will be given hereinafter by way of non-limiting example with the aid of the accompanying drawings, in which.

DETAILED DESCRIPTION OF THE INVENTION

Figure 1:
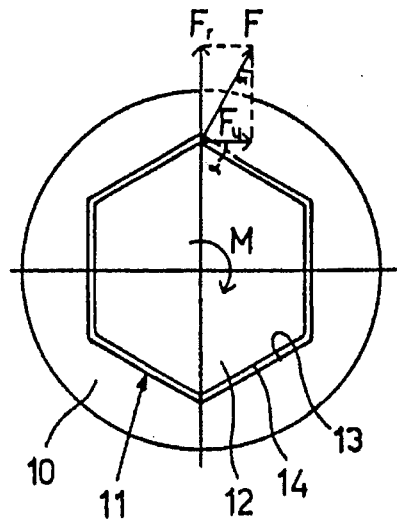
FIG. 1 is a plan view of the head of a polygonal-socket-head screw of the known art and related wrench, showing the interacting forces between the wrench and screw.

Referring to the drawings, shown in FIG. 1 is a screw of known art identified by 10 and provided with a polygonal socket 11, into which a wrench 12 having a polygonal mating profile is insertable. The screw 10 and wrench 12 exhibit respective surfaces 13, 14 of mutual engagement during the tightening and unscrewing operations. When a driving torque M is applied to the wrench, said backlash between the wrench and screw causes the former to slightly rotate clockwise relative to the latter, thereby giving rise to a reaction surface between them which is identified at very restricted areas (substantially reduced to a line) close to the wrench corners; a tightening force F is applied to this reaction surface and it is directed perpendicularly of the surface itself. Such tightening force F however, generally cannot be completely utilized as useful tightening force due to the non-radiality of the reaction surfaces.

The tightening force F in fact can be broken up into two components Fr and Fu, which are respectively radial and tangential to a circumference having as its center the screw axis and passing through the application point; said components are worth respectively:

$$Fr = F \times \cos\alpha \text{ and } Fu = F \times \sin\alpha$$

wherein α is the angle formed by the contact surface with the tangent to said circumference passing through the application point of force F.

It is apparent that component Fr does not make any contribution to the tightening action between the wrench and screw since its application straight line passes, by definition, through the rotation center of the screw itself.

Tightening therefore exclusively takes place by the action of the component $$Fu = F \times \sin\alpha.$$

As one can see, the efficiency of a tightening pair given by the ratio between the useful tightening force Fu and the tightening force F transmitted from the wrench to the screw is exclusively function of the inclination α of the contact surfaces with respect to the tangential direction at the application point of force F and the more the surfaces are close to said tangential direction; the lower this efficiency is, whereas it takes the highest values when the contact surfaces are substantially radial. In particular, for a hexagonal-head (or a hexagonal-socket-head) screw wherein α is 30°:

$$Fu = F \times \sin 30° = 0.5F$$

with an efficiency therefore of 50%.

Figure 2:
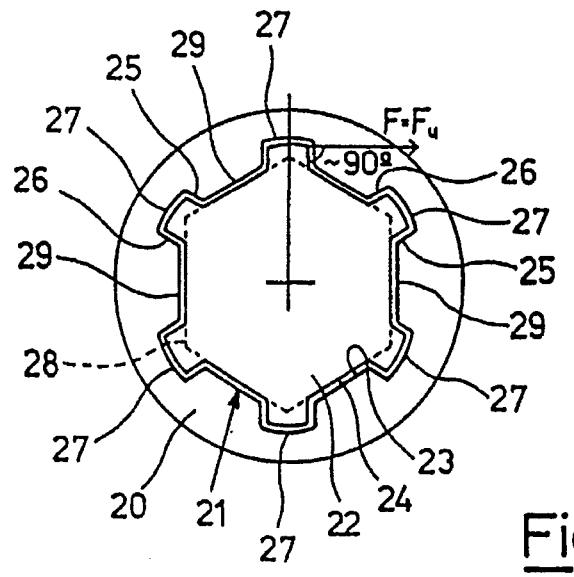
FIG. 2 is a plan view of the head of a lobate-socket-head screw of the known art and related wrench, showing the interacting forces between the wrench and screw.

Shown in FIG. 2 is a screw 20 of known art too, which is provided with a lobate-socket head 21, into which a wrench 22 is insertable which has a mating lobate profile.

The engagement of screw surface 23 with the wrench 22 includes the side faces 25, 26 of lobes 27 orientated in a direction close to the radial one, i.e. said faces have an angle of about 90° relative to the tangential direction at the application point of force F, and therefore approximately:

$$F = Fu;$$

as a result, in a tightening pair of the above type there is a very high efficiency, since practically the whole force transmitted from the wrench can be used for tightening and unscrewing, and this independently of the number of the lobes.

In the case in which a lobate tightening wrench the shape of which matches that of the screw head is not at disposal, said screw can be operated by a polygonal wrench 28 similar to the one shown in FIG. 1, provided with a number of sides corresponding to the number of the screw lobes, currently six.

Such a wrench is shown in dotted line in FIG. 2. The polygonal wrench 28 engages the union faces 29 of screw surface 23 between the screw lobes 27 at the corners thereof and therefore the efficiency of this tightening pair decreases depending on the value of angle α as shown in FIG. 1 and has a value of 50% in the case of a hexagonal wrench. When a screw tightened by means of a lobate wrench is to be unscrewed with a hexagonal wrench it is therefore necessary to apply a much greater force than it would occur with the use of said lobate wrench.

In addition, due to the backlash resulting from the difference, as provided by the rules, between the major diameter and actual diameter, which backlash causes the wrench to work against the corners formed by intersection between the side faces 25, 26 of the lobes and the union faces 29, application of a high tightening force to a hexagonal wrench in engagement with a lobate screw can easily lead to damaging of said corners, and can even jeopardize further insertions of the lobate wrench.

Figure 3:
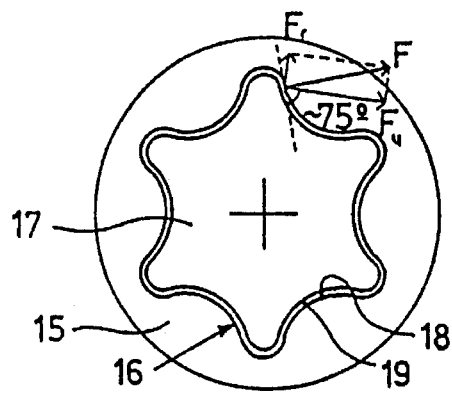
FIG. 3 is a plan view of the head of a lobate-socket-head screw of the known art, according to a profile identified as "hexalobate", and related wrench, showing the interacting forces between the wrench and screw.

FIG. 3 shows a screw 15 of the known art, which exhibits a head provided with a lobate socket 16 having a particular profile known as "Torx" (TM) and also defined as "hexalobate profile". Such a screw can be operated by means of a wrench 17 of mating profile.

Due to the configuration of the hexalobate profile and as a result of the backlash between the wrench and screw, on tightening the external surface 19 of the wrench engages the internal mating surface 18 of the screw at points where the tangent to surface 18 forms an angle a of approximately 75° at the application point of force F. Therefore the useful tightening force in this case is worth $$Fu = F \times \sin 75° = 0.966F.$$

It is therefore apparent that the efficiency of a hexalobate profile is very high; there is however the drawback that the particular conformation of the profile creates force-applying points that are situated radially at a greatly more internal position than the lobe ends.

The consequent reduction in the lever arm of said force causes the force acting on the contact points between the wrench and screw to be much higher than in a classic lobate profile, the applied torque being equal.

This profile, in addition, has the disadvantage of being incompatible with any other wrench profile currently used, so that, in case of emergency, when a hexalobate wrench is not available, it is impossible to unscrew or tighten the concerned screw.

Figure 4:
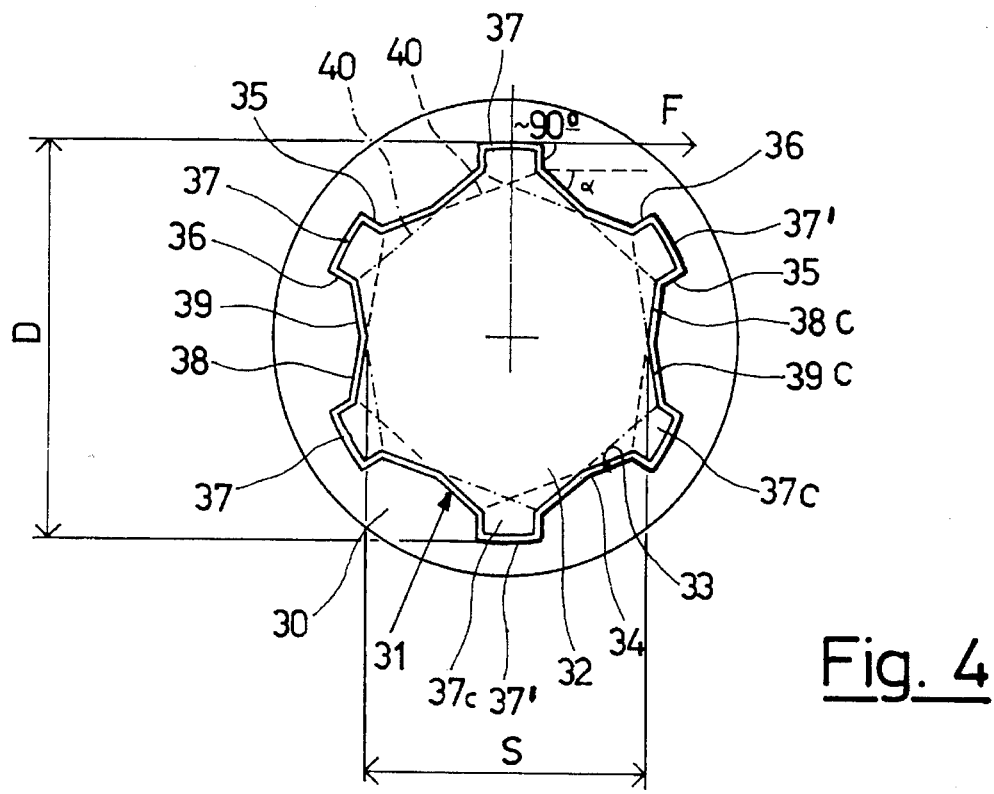
FIG. 4 is a plan view of the head of a lobate-socket-head screw according to the invention and related wrench, showing the interacting forces between the wrench and screw.

Shown in FIG. 4 is a screw 30 made in accordance with the invention; it has a head provided with a lobate socket 31 into which a mating wrench 32 of a lobate profile 34 is insertable.

In its most common embodiment the provided lobes 37 are six in number.

The engagement surface 33 of the screw 30 with the wrench 32 exhibits, at each lobe 37, a substantially circumferential face 37' and parallel side faces 35, 36 orientated in a direction close to the radial one, thereby forming an angle of almost 90° relative to the tangential direction at the application point of force F; the useful tightening force is therefore close to the force transmitted by the wrench, with an efficiency approaching 100%.

The screw according to the invention has, between each pair of adjacent lobes 37, two faces 38, 39 forming reaction surfaces with the wrench which are angled with respect to each other so as to draw an angle included between 155° and 165° and preferably of 160° which is concave towards the external part of the screw.

The corresponding mating portions of the wrench are allocated the same numeral references as the screw portions, but followed by letter "c". The wrench therefore has lobes 37c separated by surfaces 38c and 39c.

The sizes of faces 38, 39 are such that, depending on the value of the angle included therebetween, the extension of each face 38 beyond the boundary corner with the contiguous face 39 intercepts the boundary corner between the corresponding adjacent face 38 and the side face 35 of the corresponding lobe 37. In mirror image, the extension of each face 39 beyond the boundary corner with the contiguous face 38 will intercept the boundary corner between the corresponding adjacent face 39 and the side face 36 of the corresponding lobe 37.

In other words, each face of the pair belongs to a theoretical plane which is incident to the reaction surface at the union corner between the corresponding face of the reaction surface and the side face of the lobe, as is clearly shown in phantom in FIG. 4.

This configuration is due, according to the invention, to a compromise between two opposite requirements resulting from the possibility offered by the screw according to the invention of being operated, in case of emergency, by a polygonal wrench 40 (shown in dotted line in a tightening position and in chain dot line in an unscrewing position). In fact, as previously seen, the more the reaction surfaces 38 (for tightening) and 39 (for unscrewing) are inclined to the tangential direction at the application point of force F, the greater the efficiency of the driving torque is. Therefore, the planning trend would have to aim at increasing said inclination in order to increase efficiency.

Too big an angle however, would cause the extension of face 38 (respectively 39) to fall close to the boundary corner between the adjacent faces 38, 39, thereby reducing the engagement surface of said faces 38 (respectively 39) too much, which will bring about high specific efforts, capable of damaging the tightening pair.

Therefore, it has been found that an inclination of faces 38, 39 according to the invention enables a sufficiently high efficiency to be reached, while at the same time keeping the reaction surface as wide as possible between the wrench 40 and screw 30.

An angle of about 160° between the faces 38, 39, that is a respective greater inclination of same by about 10° relative to the faces 29 of a normal hexagonal socket, also enables the whole difference between the nominal size (denoted by S in FIG. 4) of the hexagonal wrench as provided by the regulations, and the actual size of same (which difference corresponds to 0.07÷0.15 mm) to be utilized, in order to make the hexagonal wrench work with its surface (and not with its corners) against the whole reaction surface 38 (or 39) of the screw.

In this manner the efforts are prevented from being greatly concentrated on small areas of the wrench and screw.

In the construction technology for a lobate-socket-head screw it is prescribed that, for reasons connected with the resistance to stresses, the central angle subtending each of the engagement surfaces against which a polygonal wrench fitted thereinto works, be approximately equal to the angle subtending each lobe. Therefore it is suitable for a screw according to the invention, since only the faces 38 (or respectively 39) of the engagement surface 33 are each time stressed, that the central angles subtending each lobe 37 and each one of faces 38, 39 respectively should have substantially similar amplitudes, in particular corresponding to 18°÷22°, preferentially 20°, in the case of a hexagonal lobate-socket head.

Therefore, the extension of faces 38, 39 and their mutual inclination being established, the size of the side faces 35, 36 of lobes 37 is consequently determined, since the external diameter D of the socket is established by the regulations as being 1.3÷1.4 times said size S of the hexagonal wrench.

The hexagonal lobate-socket-head screw according to the invention exhibits, as above said, an angle between each pair of faces 38, 39 which is concave towards the outside of the screw itself. Such an angle is included to advantage between 155° and 165° and preferably corresponds to 160°, which means that, as compared with the hexagonal lobate socket shown in FIG. 2, faces 38, 39 are more angled to the tangential direction by about 7.5÷12.5°, said angle a being therefore worth 37.5°÷42.5°. Based on formula $$Fu = F \times \sin\alpha,$$

the force to be used with a hexagonal wrench working within the socket of a screw according to the invention varies between 61% and 68% of the force transmitted to the screw; there is therefore an efficiency which is greater than the usual efficiency of a hexagonal wrench-hexagonal screw pair by 22÷36%. Such a force is in addition applied to a much greater reaction surface, thereby greatly reducing the risks of breakages or permanent deformations.

It is therefore apparent that the intended object has been achieved. In fact a screw has been made which is provided with a lobate socket capable of being operated both by a wrench of a mating profile which will give the maximum efficiency for the tightening pair, and a traditional polygonal wrench which will still give an efficiency higher than a similar coupling obtained with a lobate screw of known art.

Obviously, the above description of an embodiment applying the innovatory principles of the present invention is given by way of example only and therefore must not be considered as a limitation of the scope of the invention as herein claimed.

Figure 5:
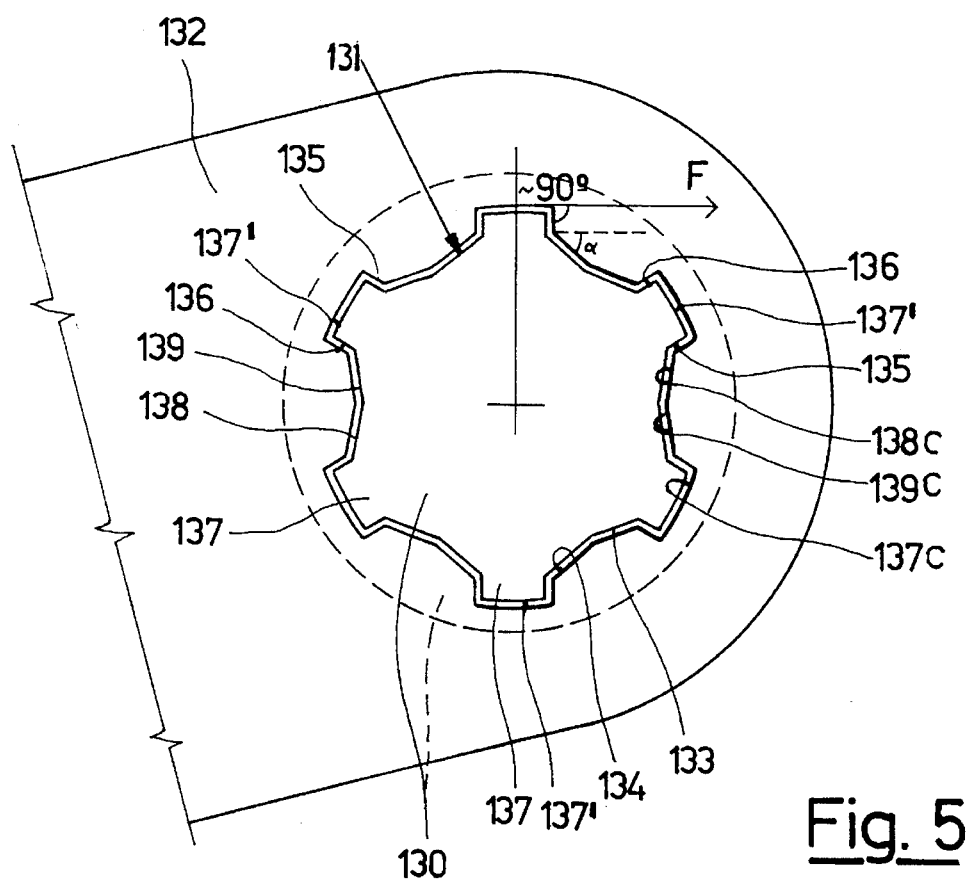
FIG. 5 is a plan view of the head of a lobate-head screw according to the invention and related wrench.

For example, the screw described and illustrated in the drawings as a female screw having a lobate socket could also be a male screw having a lobate head, to be operated by a female wrench, the sizes and construction features remaining unchanged. For clarity purposes, in the representation of such an embodiment, depicted in FIG. 5, similar or corresponding elements have been allocated the same reference numerals as in FIG. 4 but increased by 100. Therefore a screw 130 having a lobate head 131 is provided, which can be received in a mating wrench 132 having an engagement surface 134, The lobate head 131 has an engagement surface 133 with lobes 137 which have a substantially circumferential face 137' and side faces 135, 136.

For each pair of adjacent lobes 137 there are reaction faces 138, 139 for the mating surfaces of the wrench 132. The main wrench portions matching with the screw head are allocated the same reference numerals followed by letter "c". The wrench 132 therefore has lobes 137c separated by angled surfaces 138c and 139c.

As for the embodiment shown in FIG. 4, the useful tightening force is close to the force transmitted by the wrench and its efficiency is near 100%.

As for the embodiment shown in FIG. 4, obviously the wrench can be a manually operated or power operated wrench, of the right angle (Allen) type or box type, ecc. Since the wrenches must conform to the screw heads, it is obvious that the above stated preferred conformations and different angle values for the head surfaces are also valid for the mating wrench.

What is claimed is:

1. In a screw of the type having a head portion and an integral shank portion, and wherein said head portion comprises a lobate head for a lobate-socket head having six angularly spaced lobes each of which is formed with a first face directed in a substantially circumferential manner with respect to the axis of the screw, and with two other substantially parallel faces directed inwardly with respect to the axis of the screw, and characterized in that said head portion of the screw is further provided with a plurality of reaction surfaces for a tightening wrench, said reaction surfaces including between each pair of adjacent lobes a pair of intersecting faces inclined to each other to form an angle concave towards the outside of the head portion of the screw so that one face of each intersecting pair thereof forms part of the side of a first hexagon, and the other face of each intersecting pair thereof forms part of the side of a second hexagon, said hexagons being angularly rotated with respect to each other about the axis of the screw and being operative to constitute two different sets of reaction surfaces for a wrench of a hexagonal profile.

2. In a screw according to claim 1, characterized in that each of the faces of each pair included between two adjacent lobes belongs to a theoretical plane incident to said reaction surface at one union corner between the corresponding face of the reaction surface located close to the side of the other face of the pair, and the adjoining lobe face directed inwardly of the screw.

3. In a screw according to claim 1, characterized in that the angle formed between each pair of said intersecting faces included between 155° and 165°.

4. In a screw according to claim 3, wherein said angle is 160°.

5. In a screw according to claim 3, characterized in that the distance (S) between adjacent vertices of said angle is equal to the nominal size of hexagonal wrenches according to rules UNI 5931.

6. In a screw according to claim 3, characterized in that each lobe extends circumferentially of the screw axis through an angle included between 18° and 22°.

7. In a screw according to claim 6, wherein each lobe extends circumferentially of the screw axis through an angle of 20°.

* * * * *